United States Patent [19]
Anderson et al.

[11] 3,901,422
[45] Aug. 26, 1975

[54] FOLDING CAR TOP CARRIER

[76] Inventors: Franklin C. Anderson, 557 Ridge Rd.; Irvin E. Dorschner, 336 W. McKinley, both of Owatonna, Minn. 55060

[22] Filed: Aug. 31, 1973

[21] Appl. No.: 393,658

[52] U.S. Cl. .............................. 224/42.1 E; 296/27
[51] Int. Cl. ............................................. B60r 9/00
[58] Field of Search ................... 224/42.1 E, 42.1 D; 296/23 R, 23 A, 23 F, 23 G, 23 MC, 27

[56] References Cited
UNITED STATES PATENTS

| | | | |
|---|---|---|---|
| 2,589,772 | 3/1952 | Carter et al. | 224/42.1 E |
| 2,654,516 | 10/1953 | Edwards | 224/22.1 E |
| 2,683,265 | 7/1954 | Wayne | 296/23 R |
| 3,138,307 | 6/1964 | Priban | 224/42.1 E |
| 3,360,294 | 12/1967 | Cieslak | 296/27 |
| 3,458,232 | 7/1969 | Frank | 296/27 |
| 3,514,023 | 5/1970 | Russell et al. | 224/42.1 E |
| 3,560,042 | 2/1971 | McCarthy | 296/23 R |

*Primary Examiner*—Robert J. Spar
*Assistant Examiner*—Donald W. Underwood
*Attorney, Agent, or Firm*—Merchant, Gould, Smith & Edell

[57] ABSTRACT

Horizontally disposed rigid top and bottom panels have rigid side and end panels connected therebetween for movements of the panels between an erected first cargo enclosure position on the roof of a motor vehicle and a folded second cargo supporting platform position on the vehicle roof. Access openings and cooperative closures on the side panels provide access to the carrier in the first position. Latch members secure the side and end panels in the first position and further latch members secure the top and bottom panels in the second position. Side and end frames are mounted to form barriers at the side and end edges of the top and bottom panels in the second position. Supporting members support the cargo carrier on the vehicle and a flexible resilient skirt encloses the support members beneath the bottom panel.

14 Claims, 11 Drawing Figures

FOLDING CAR TOP CARRIER

BACKGROUND OF THE INVENTION

1. Field of the Invention

The present invention relates generally to cargo carriers for motor vehicles and more particularly is directed to cargo carriers of the type that enclose the cargo which they carry.

2. Description of the Prior Art

Many types of cargo carriers for motor vehicles have heretofore been manufactured. Examples of such carriers may take one or more of the following forms: rigid frames and solid platforms, which form open carriers; collapsible frames, which may be provided with flexible enclosures in an erected state; rigid wall enclosures and various combinations of the above. However, the above carriers often present a variety of problems. By way of example, cargo carriers which rely on flexible canvas covers or tarpaulins to enclose the cargo often become subject to severe damage during high speed travel along present-day highways. This, of course, renders the protection of the canvas cover or tarpaulin practically useless during inclement weather. In addition, all of such carriers, under both loaded and unloaded conditions present a somewhat unpleasant appearance as well as high wind resistance during forward motion of the vehicle. The latter results in higher gas consumption and the need to remove the carriers completely during periods of nonuse as well as the need to find a place of storage upon such removal. To overcome this problem, cargo carriers employing rigid walls to enclose the cargo have been provided which present a more streamlined appearance. This type of carrier avoids the problems inherent in the flexible type cover as related to damage during high speed travel and to a certain degree, these problems related to appearance and wind resistance. However, these carriers are still normally removed during periods of nonuse since they obviously still present substantial bulk and resistance to forward travel of the vehicle. Thus, it can be seen that many if not all of the above carriers must normally be removed from a motor vehicle for one or more of the above reasons and a place of storage must be provided therefor.

SUMMARY OF THE INVENTION

With these problems in mind, the present invention is directed to a cargo carrier for motor vehicles which provides the advantages of both the open platform-type carrier and the erected enclosure type carrier. In addition, the present invention provides a cargo carrier which is not only attractive in its erected and folded positions, but one which provides a minimum of resistance during high speed forward motion of the motor vehicle in both of these positions. This, of course, results in a cargo carrier which need not be removed from the motor vehicle and stored during periods of nonuse and which can be permanetly affixed to the roof of the motor vehicle so as to be constantly available for use. To this end, a cargo carrier is provided which includes rigid horizontally disposed top and bottom panels and spaced rigid side and end panels, the side panels having access openings formed therein and closure members disposed to cover the openings. The panels are hingedly and slidably secured together for movements between a first generally vertically disposed cargo enclosure position extending between the top and bottom panels and a second generally horizontally disposed folded position wherein the side and end panels are sandwiched between the top and bottom panels with the top and bottom panels in a closely spaced relationship to form an open cargo platform. End and side frame members are secured to opposite end edge portions of the bottom panels and to the side panels respectively to be disposed in vertical planes peripherally of the top and bottom panels, the side and end frames extending above the level of the top and bottom panels in the first position. First and second latch devices releasably secure the side and end panels in the first position and further latch devices releasably secure the top and bottom panels in the second position. Support members are provided to support the cargo carrier in close proximity to the roof of the motor vehicle. A flexible resilient skirt is carried by the support members and the bottom wall. The skirt is disposed to engage the roof of the vehicle peripherally of the bottom wall and outwardly of the support members to enclose the support members beneath the bottom wall of the carrier. Junctures of the side and end panels and side and top panels are provided with seals to seal the interior of the cargo carrier from the exterior thereof during the first position.

BRIEF DESCRIPTION OF THE DRAWINGS

Referring to the drawings, wherein like reference numerals indicate like parts throughout the views.

DESCRIPTION OF THE PREFERRED EMBODIMENT

Figure 1:
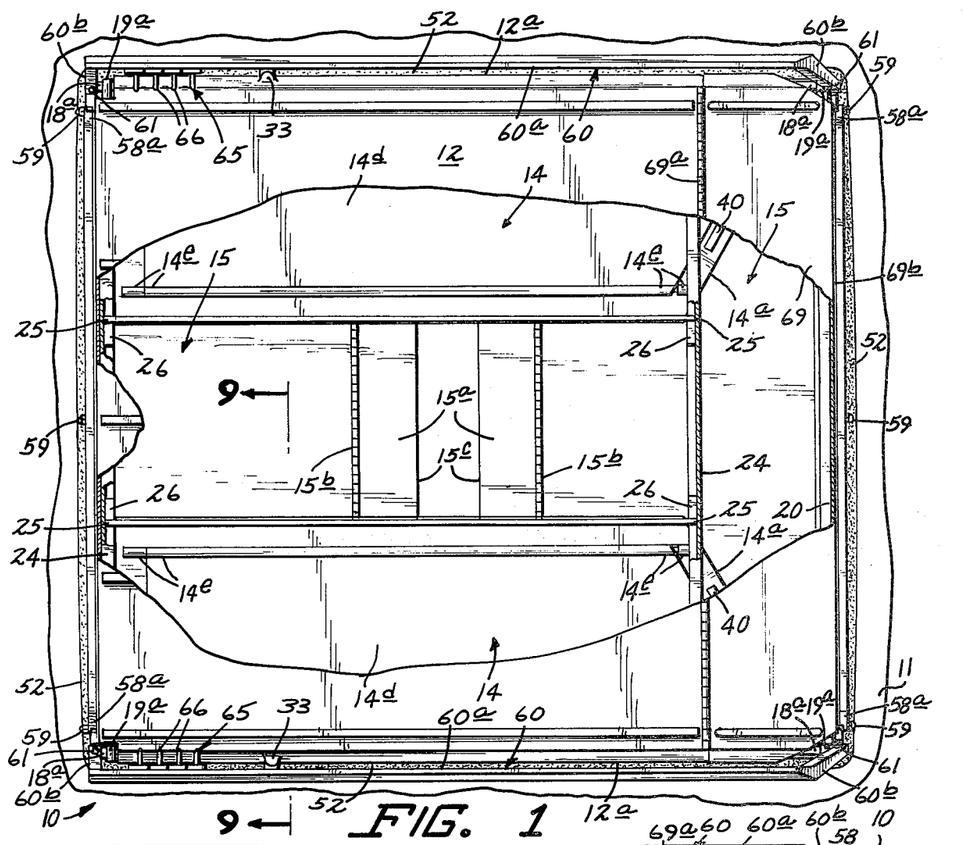
FIG. 1 is a view in top plane of a cargo carrier mounted on the roof of a motor vehicle and shown in a folded or collapsed condition, portions thereof being broken away and shown in section.
Figure 2:
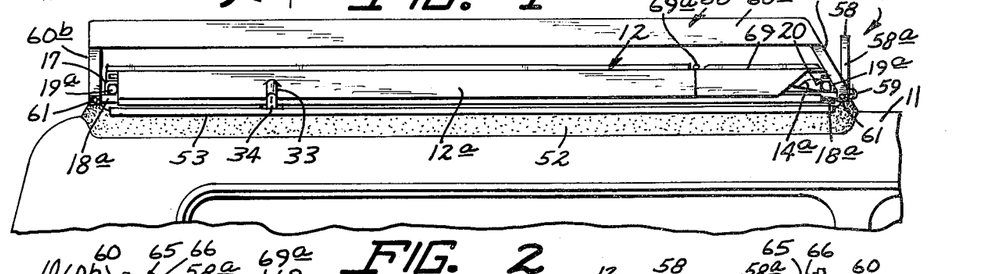
FIG. 2 is a view in side elevation thereof.
Figure 3:
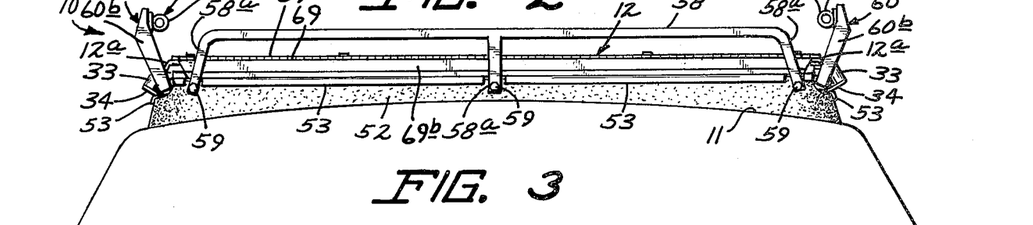
FIG. 3 is a view in end elevation thereof.
Figure 4:
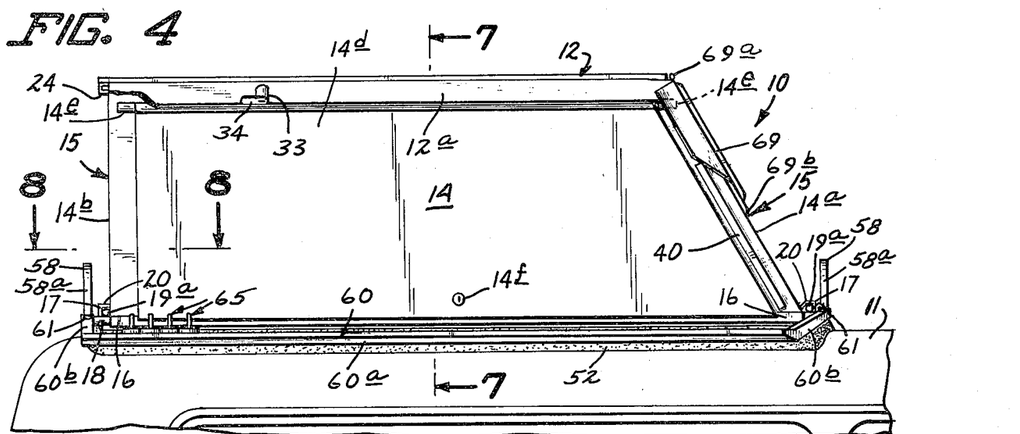
FIG. 4 is a view similar to FIG. 2 illustrating an erected position of the cargo carrier.
Figure 5:
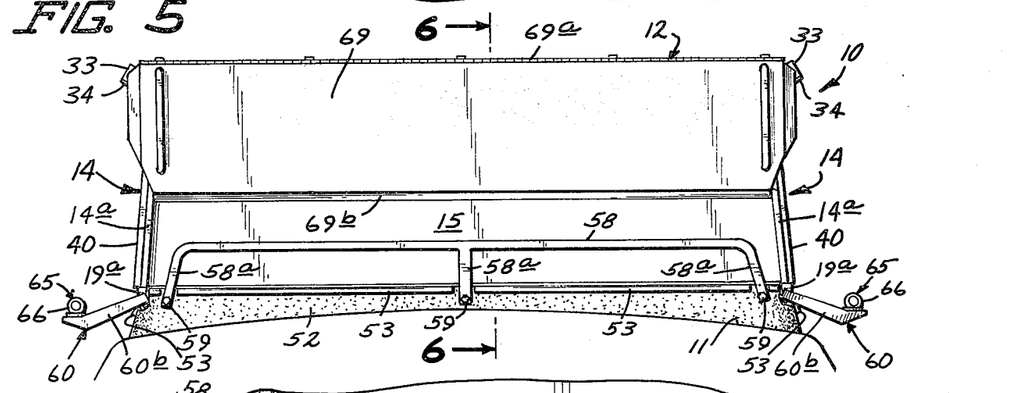
FIG. 5 is a view similar to FIG. 3 showing the erected position of FIG. 4.

Referring now more particularly to the drawings, it will be observed that a folding cargo carrier, indicated generally by the numeral 10 is illustrated as applied to the roof 11 of a motor vehicle. The roof of the vehicle is only fragmentarily shown. FIGS. 1–3 illustrate a folded cargo supporting platform position, hereinafter referred to as a second position and FIGS. 4–5 illustrate an erected cargo enclosure position, hereinafter referred to as a first position. Folding cargo carrier 10 includes rigid top and bottom panels 12, 13 which are generally horizontally disposed and have a generally rectangular shape. Spaced rigid side panels 14 and end panels 15 are disposed to extend along respective side and end edge portions of the bottom panel 13. Hinge means secure the side and end panels for pivotal movements between the first erected position and the second folded position. The first erected position, as seen in FIGS. 4–7 of the drawings, shows the spaced side and end walls in a generally vertically disposed cargo enclosure position extending between the spaced top and bottom panels 12, 13. The second folded position is illustrated in FIGS. 1, 2, 3 and 9 which show the side and end panels 14, 15 overlying the bottom panel 13 and generally sandwiched between the closely spaced top and bottom panels 12, 13 to form an open cargo supporting platform.

The hinge means securing the side and end panels 14, 15 for movements between the first and second positions include upwardly formed flanges 16, 17 extending along side and end edge portions of the bottom panel 13. Hinge pins 18, 19 are secured to the lower edge of the side and end edge panels 14, 15 respectively. The hinge pins 18, 19 have opposite end portions 18a, 19a respectively which extend beyond the opposite ends of a respective panel and are positioned inwardly and adjacent to a respective one of upwardly formed flanges 16, 17. The end portions 19a of hinge pins 19 overlie adjacent end portions 18a of hinge pins 18. In this manner, lateral movement of the hinge pins 18 in a horizontal direction is limited by engagement with a respective flange 16 and an adjacent portion of the flanges 17 and vertical movement of the hinge pins 18 is limited by the bottom panel 13 and the overlying relationship of the portions 19a with portions 18a. Each of the end flanges 17 are inwardly formed to overlie and engage a respective one of the pins 19, as at 20, to maintain the above relationship of the pins 18, 19 during the first and second positions and during movements therebetween.

Figure 6:
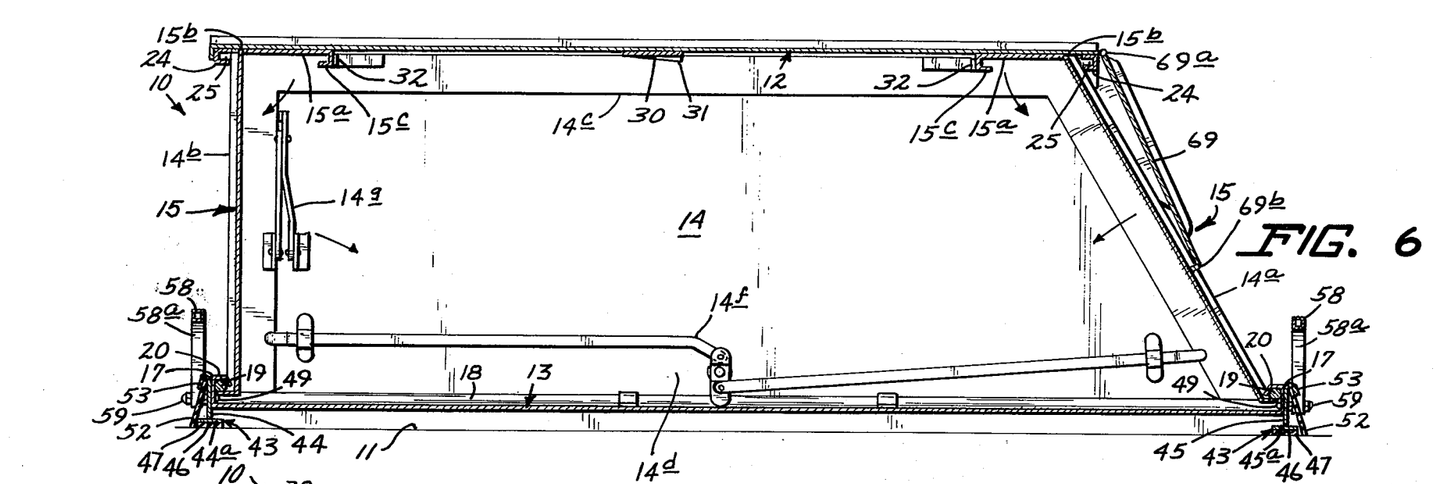
FIG. 6 is an enlarged sectional view as seen generally from the line 6—6 of FIG. 5.

As seen particularly in FIGS. 4, 6 side panels 14 each have opposite end edges 14a, 14b. One of the edges 14a of each panel 14 is disposed to slant angularly toward a respective opposite edge 14b for reasons which will become apparent hereinafter. Each of the side panels 14 also includes an opening 14c formed therein to gain access to the interior of cargo carrier 10 when the cargo carrier 10 is disposed in the erected cargo enclosure position of FIGS. 4–7. Closure members or doors 14d are pivotally secured by hinges or the like 14e to the side panels 14 to close the openings of 14c. Latch mechanisms 14f, including a cylinder lock, mounted on each of the doors 14d are operable by a key from the exterior of the carrier 10 to secure the doors 14d in a position to close the openings 14c. Articulate bracket members 14g support the doors 14d in an open condition illustrated by dotted lines in FIG. 7. For the purpose of reducing the resistance to forward travel of the vehicle when the cargo carrier 10 is in the erected first position of FIGS. 4–7, one of the end panels 15, preferably a forwardly disposed panel 15, is disposed to slant angularly toward the other end panel 15 in conjunction with the end edges 14a. With this arrangement, the angularly inclined forwardly exposed surface of the end panel 15 provides a minimum of resistance to air flow during high speed forward motion of the vehicle on which it is mounted. This, of course, results in a reduced fuel consumption during travel of the vehicle when the cargo carrier 10 is in the erected cargo enclosure position of FIGS. 4–7.

Connecting means slidably mount an upper edge of each of the side panels 14 to the top panel 12 to control the position of the top panel 12 relative to the bottom panel 13 during movements of the side panels 14 between the first and second positions. The connecting means include a channel 24 formed on the lower surface of the top panel 12 adjacent each end edge thereof. Channels 24 extend between opposite side edges of the top panel 12 and open inwardly toward each other. Channels 24 are laterally outwardly positioned with respect to an adjacent opposite end 14a, 14b of the side panels 14. Trunnions 25 extend from the opposite ends 14a, 14b at the upper edge of each of the side panels 14 and each trunnion 25 is engaged in an adjacent one of the channels 24 for sliding movements longitudinally thereof. Inner stop members 26, mounted on the top panel 12 in each of the channels 24, limit movements of the trunnions 25 toward each other and outer stop members 27, on the top panel 12, are positioned to limit movement of the trunnions 25 toward a side edge of the top panel 12.

A relatively flat latch member 30 is secured to the lower surface of the top panel 12 so as to be positioned in closely spaced relationship to each side edge of the top panel 12. Each latch member 30 has a corner portion formed to provide a stop shoulder 31 which is movable toward and away from the lower surface of the top panel 12. Each stop shoulder 31 engages an adjacent surface at an adjacent upper edge of a respective side panel 14 to maintain the side panel in engagement with a respective outer stop member 27. Stop shoulders 31 are movable toward the lower surface of the top panel 12 upon engagement thereof by the upper edge of the side panels 14 during movements of the upper edge toward to outer stop members 27.

For the purpose of securing the end panels 15 in the erected first position of FIGS. 4–7 each end panel 15 is provided with an extension 15a hingedly connected along an upper edge of each of the end panels 15 as at 15b. Each of the extensions 15a is formed at an outer edge thereof with a rolled edge 15c which extends between side panels 14. Abutment members 32 are formed on the inwardly facing surface of each of the side panels 14. The abutment members 32 are spaced from an upper edge of the end panels 15 a sufficient distance to permit the extensions 15a of the end panels 15 to pivotally movable into juxtaposition with the adjacent lower surface of the top panel 12 when the end panels 15 are in their first or erected position of FIG. 6. This causes frictional engagement of adjacent ones of the abutment members 32 with respective flanged portions 15c of the extension 15a to maintain the end panels 15 in their first position. Further latch means in the nature of a cylinder lock 33 is secured one to each angularly downwardly formed wing portion 12a. Each cylinder lock 33 includes a pivot latch arm 34 mounted on the cylinder lock 33 to be pivoted to a position to underlie and engage the bottom panel 13 when the cargo carrier 10 is in the second folded position of FIGS. 1, 2, 3 and 9.

When the cargo carrier 10 is utilized in the erected first position of FIGS. 4–7 it is necessary to provide some means to seal the interior of the cargo carrier 10 against the entrance of water or dust thereinto. For this purpose, each of the side panels 14 is formed at the opposite end edges 14a, 14b to provide a groove 35. Grooves 35 of each panel 14 are disposed to open toward each other and adjacent side edges of the end panels 15 are formed with an angularly projecting portion 36 which is receivable in an adjacent groove 35 when the panels 14, 15 are in their erected first position. A resilient sealing element 37, positioned in each of the grooves 35 to extend longitudinally thereof, is engaged by a respective angularly projecting portion 36 to form a sealed joint at the juncture of the side panels 14 and end panels 15. Additional sealing elements 38 extend longitudinally between the opposite end edges of the top panel 12 and are engaged by the upper edge of the side panels 14 in the first position. Outer stop members 27 are formed by channels which are secured to the bottom surface of top panel 12. Channel stop members 27 open toward each other and extend between opposite end edges of the panel 12. A sealing element 38 is positioned in each of the channel stop members 27. Each of the doors 14d of side panels 14 also includes a seal element 39 extending along three sides of a respective opening 14c in the side panel 14. The bottom edge of the door 14d extends to overlap an adjacent upwardly formed flange 16 along the side edge of bottom panel 13. A rain gutter 40 is positioned adjacent to and extends longitudinally of the edge 14a of side panels 14. Each rain gutter 40 provides additional protection against the entry of water through the leading edge of a respective door 14d under conditions of high speed travel.

Supporting means for the cargo carrier in the nature of spaced supporting members 43 are positioned at each end edge of the bottom panel 13. Each supporting member 43 includes laterally extended leg portions 44, 45 which extend laterally from a point centrally of the bottom panel 13 toward opposite side edges thereof. Each leg portion 44, 45 has a foot portion 44a, 45a. Foot portions 44a, 45a cooperate to define a downwardly facing arcuate surface 46 generally coextensive with the leg portions 44, 45 between opposite side edges of the bottom panel 13. A flexible resilient pad 47 is adhesively secured to each foot portion 44a, 45a to engage the roof 11 of the vehicle as will presently be described. Each of the supporting members 43 is adjustably secured to a respective end edge of the bottom panel 13 by pivot means in the nature of an inner bolt 48. Bolt 48 extends through a respective upwardly formed flange 17 of the bottom panel 13. Inner bolt 48 projects from the flange 17 and extends through openings formed in the inner overlapped ends 44b, 45b of the leg portions 44, 45. Inner bolt 48 of each supporting member 43 mounts respective leg portions 44, 45 to the bottom panel 13 for movements of a lateral end 44c, 45c in a vertical direction. The bolts 48 are axially aligned centrally in the flanges 17. Securing means for limiting the pivotal movement of the leg portions 44, 45 on the axis of the bolts 48 include outer bolts 49. Bolts 49, like bolts 48, extend through flanges 17 and project therefrom to extend through slots 50 formed in the lateral ends 44c, 45c of leg portions 44, 45 in each supporting member 43. Nuts 51 are threadedly engaged on the bolts 48, 49 to secure the leg portions 44, 45 on the bolts 48, 49. With this particular supporting structure arrangement it can be seen that loosening of nuts 51 associated with bolts 49 enables the top and bottom panels 12, 13 to be horizontally oriented with respect to the roof 11 by pivotal movements on the bolts 48. Also, vertical movements of the lateral ends 44c, 45c varies the curvature of the arcuate surface 46 an amount sufficient to correspond generally to the arcuate curvature of the roof 11. A plurality of screws or the like, not shown, may be utilized to secure the foot portions 44a, 45a permanently to the roof 11. Present technology in the development of bonding agents permits the alternate use of adhesives to permanently affix the cargo carrier 10 to the roof 11 without the use of screws.

A flexible resilient skirt 52 is positioned to extend peripherally of the carrier 10 laterally outwardly of the support members 43. Skirt 52 encloses the supporting members 43 beneath the bottom panel 13 so as to provide a pleasing appearance to the permanently affixed cargo carrier 10. A downwardly opening channel member 53 is positioned to extend peripherally of the bottom panel 13 so as to receive the upper edge of the skirt 52. Skirt 52 is coextensive with and depends from the channel member 53 to engage the underlying surface of the roof 11. That portion of the channel member 53 extending longitudinally of the end edges of the bottom panel 13 is formed as an integral part of the leg portions 44, 45 and that portion of the channel member 53 extending longitudinally of side edges of the bottom panel 13 is provided with supporting bracket members 54. One bracket member 54 is secured to the bottom surface of the bottom panel to extend longitudinally of each side edge of the bottom panel 13. Channel members 53 associated with the supporting bracket members 54 are mounted for vertical adjustments relative thereto by means of nut-equipped bolts or the like extending through the bracket members 54 and slots 55 formed in the members 53, see FIG. 9. This construction enables vertical adjustments of the portions of the skirt 52 along the side edges of the bottom panel 13 in conjunction with vertical adjustments of lateral ends 44c, 45c of support members 43.

Figure 7:
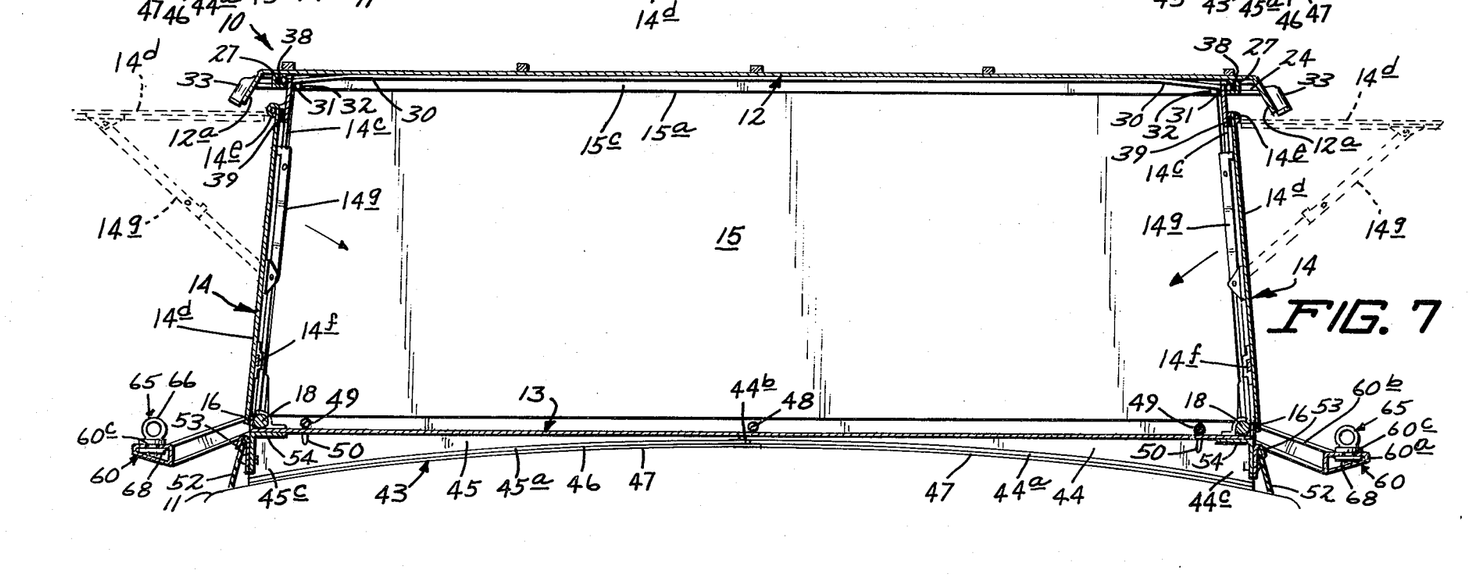
FIG. 7 is an enlarged sectional view as seen generally from the line 7—7 of FIG. 4.
Figure 8:
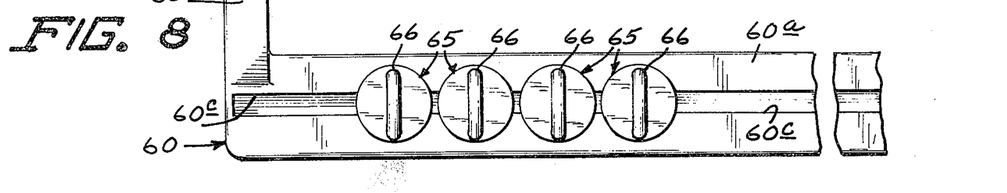
FIG. 8 is a greatly enlarged fragmentary view in horizontal section as seen generally from the line 8—8 of FIG. 4, portions thereof being broken away.
Figures 9, 10, 11:
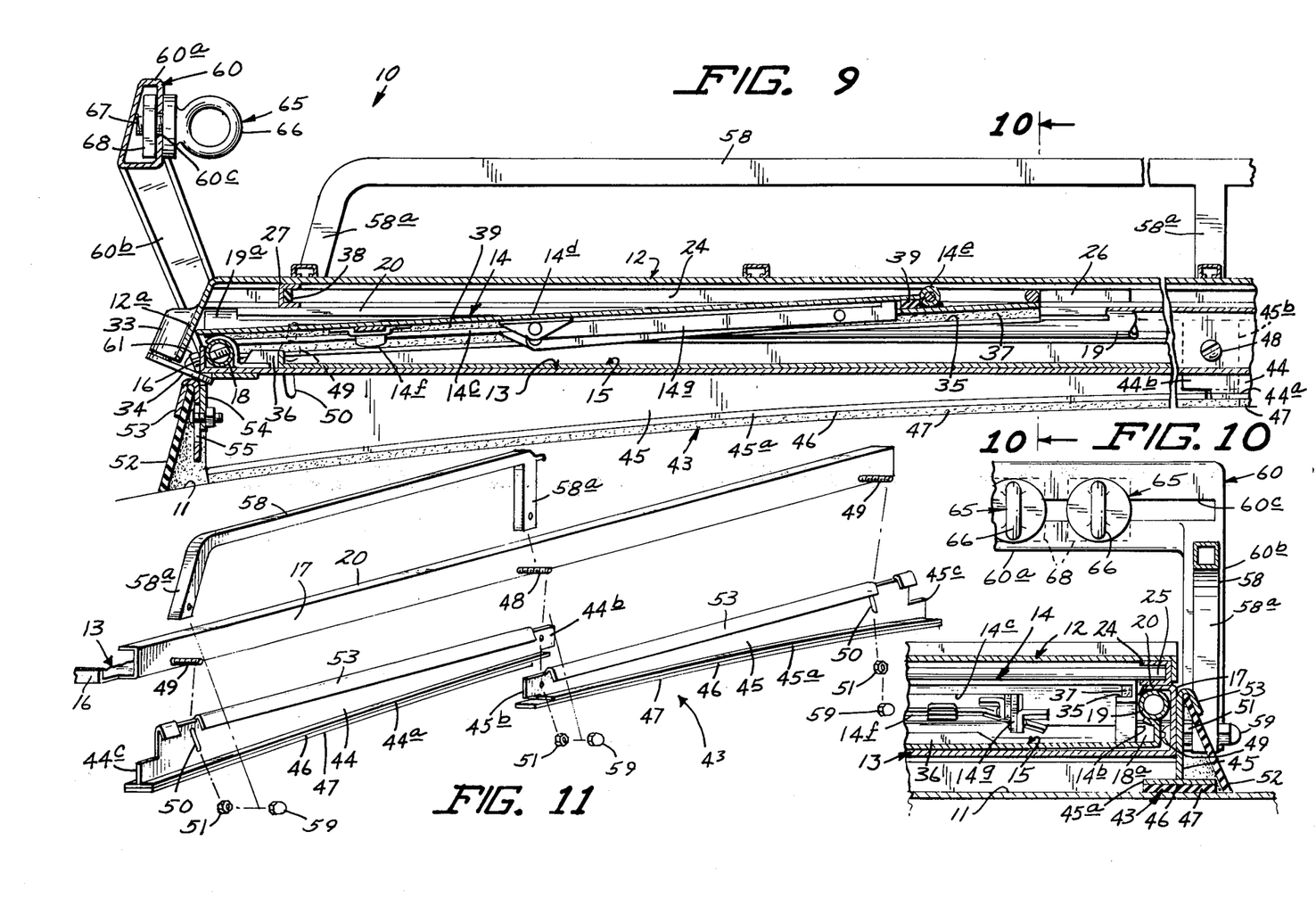
FIG. 9 is a greatly enlarged sectional view as seen generally from the line 9—9 of FIG. 1, portions thereof being broken away.
FIG. 10 is a fragmentary view in vertical section as seen generally from the line 10—10 of FIG. 9.
FIG. 11 is a fragmentary perspective view of one of the support members of the present invention illustrating how the support member is mounted to the bottom panel of the cargo carrier.

Spaced end frames 58 are secured one to each end edge portion of the bottom panel 13 to extend along respective end edge portions in generally vertically disposed planes. Frames 58 project above the level of the top and bottom panels 12, 13 when the panels are disposed in the second folded position. Each end frame 58 includes three depending leg portions 58a having openings formed therein through which the inner and outer bolts 48, 49 extend. Cap nuts 59 have threaded engagement with the ends of the bolts 48, 49 to secure the end frames 58 in place, see FIGS. 10, 11. A pair of spaced side frames 60 are disposed to extend one along each side edge portion of the bottom panel 13. The side frames 60 cooperate with the end frames 58 to provide a peripheral barrier for the cargo carrier 10 in the open cargo supporting platform position of FIGS. 1, 2, 3 and 9. As shown, each side frame 60 includes a longitudinally extended cross-sectionally C-shaped rail 60a having angularly extended legs 60b at opposite ends thereof. The projected end of each angular leg 60b is secured to the lower portion of an adjacent side panel 14 by means of a nut-equipped bolt 61. Bolt 61 extends through aligned openings formed in the projected ends of the legs 60b and opposite ends 18a of hinge pins 18. The aligned openings in the opposite ends 18a are disposed to extend therethrough in a direction to position the legs 60b generally at right angles to the plane of respective side panels 14. As seen by reference to FIGS. 3, 5 this arrangement of side frames 60 enables the side frame 60 to move in conjunction with the pivotal movements of the respective side panels 14 on the hinge pins 18. As such, the side rails 60 assume the barrier forming position of FIG. 2 wherein they are disposed above the level of top and bottom panels 12, 13 in generally vertical planes during the second position of carrier 10. Should the cargo carrier 10 be disposed in the first enclosure forming position of FIG. 5 the side frames 60 move in conjunction with the side panels 14 to the generally horizontal shelf forming position shown in FIG. 5. This allows the doors 14d to be moved to the open dotted line condition of FIG. 7 without interference from the side frames 60. The horizontal position of side frames 60 in FIGS. 5 and 7 provide convenient shelves for temporarily supporting various articles of cargo to be stored within the cargo carrier 10.

When the cargo carrier 10 is utilized in the second open platform position of FIGS. 1, 2, 3 and 9 it is generally desirable to provide some means for securing the articles carried thereby to the open platform or top panel 12. For this reason, rails 60a have slots 60c, formed by the cross-sectionally C-shaped configuration thereof, directed inwardly toward the cargo carrier 10. A plurality of anchor members 65 are provided for each side frame 60. Each anchor member 65 includes an eye portion 66 and a threaded shank portion 67. Each shank portion 67 is received within a respective slot 60c and has threaded engagement with a rectangularly shaped nut 68 disposed within the C-shaped configuration of the rail 60a. The rectangular configuration of the nuts 68 precludes rotation thereof in the C-shaped configuration and permits the anchor members 65 to be loosened and adjustably secured in desired locations longitudinally of the slot 60c. Elastic tie elements or the like may be then secured between the eye portions 66 of the anchors 65 of the spaced side frames 60 to secure the cargo in place.

As can be seen by reference to FIGS. 1–6, top wall 12 is somewhat shorter in dimension between opposite end edges thereof with respect to the bottom panel 13. This is due to the angular relationship of one of the end panels 15 with the other end panel 15. This arrangement exposes a portion of the angularly disposed end wall 15 and bottom panel 13 when the cargo carrier 10 is in the folded position of FIGS. 1, 2 and 3. An extension 69 is hingedly connected to the end edge portion of the panel 12, as at 69a, to overlie that portion of the end panel 15 and bottom panel 13 which is exposed by the shorter dimension of the top panel 12. The extension 69 forms a generally coplanar extension of the top panel 12 in the second or folded position of FIGS. 1, 2 and 3. When the cargo carrier 10 is moved to the first or erected position of FIGS. 4–7, the extension 69 assumes a position wherein it lies generally in juxtaposition with respect to the adjacent angularly disposed end panel 15 with the projected edge 69b thereof in engagement with the adjacent end panel 15, see FIG. 6. In this position, extension 69 serves to form a barrier against the entry of rain or dust into the interior of the erected cargo carrier 10.

During periods of nonuse as an enclosure type carrier, it is desirable to collapse the carrier 10 from the erected first position of FIGS. 4–7 to the second folded or platform position of FIGS. 1, 2 and 3. This provides a cargo carrier 10 which not only presents less resistance during forward travel of the vehicle at high speeds, but one which has a more pleasing appearance. To accomplish this, a key is first inserted in the cylinder locks of the latch mechanisms 14f, rotated to release the mechanism 14f and permit the doors 14d to be moved to the dotted line positions of FIG. 7. Thereafter, rolled edge 15c of the extensions 15a are grasped and the extensions 15a moved in the direction of the arrows out of engagement with their respective abutments 32 (see FIG. 6). End panels 15 are then pivoted on the axis of respective pins 19 to a position wherein they are horizontally disposed in engagement with the bottom wall 13. At this time, a latch member 30 associated with one of the side panels 14 is engaged through a respective opening 14c so as to move the stop shoulder 31 thereof out of engagement with the adjacent side panel 14. The door 14d on the released side panel 14 is then closed and the released side panel 14 is pivoted on the axis of a respective pivot pin 18 to cause the trunnions 25 at the upper edge thereof to move longitudinally within a respective channel 24 until the trunnions 25 engage the inner stop members 26. During such movements the top panel 12 and opposite side panel 14 partake of pivotal movement on the axis of the hinge pin 18 associated with the opposite side panel 14. This allows the side of the top panel 12 associated with the released side panel 14 to move into a position in close proximity to the bottom panel 13. The latch member 30 associated with the unreleased side panel 14 is then operated, through the opening 14c thereof, to release the stop shoulder 31 from engagement with the unreleased side panel 14. The door 14d thereof is then closed and the other side panel 14 is pivoted like the first panel until the trunnions 25 thereof engage the inner stop members 26. At this stage, the top and bottom panels 12, 13 have reached a state of parallelism in which the top panel 12 is disposed in closely spaced relationship to the bottom panel 13 with the end walls 15 and side walls 14 sandwiched therebetween, see FIGS. 1 and 9. Finally, a key, not shown, is inserted into the cylinder locks 33 mounted on each of the wings 12a of the top panel 12 and rotated to cause the latch arms 34 to underlie and engage the bottom panel 13, as shown particularly in FIG. 9 of the drawings. This secures the top and bottom wall 12, 13 in the closely spaced relationship of FIG. 9 to prevent accidental displacement thereof due to wind pressures during high speed travel of the vehicle on which the cargo carrier 10 is mounted. When it is desired to again erect the cargo carrier 10 to the first position of FIGS. 4–7, the above described procedure is performed in a reverse sequence.

As can be seen from the above description, only a single person is required to either erect or fold the cargo carrier 10. In addition, the particular arrangement of parts enables the cargo carrier 10 to be moved to the second collapsed or folded position wherein the cargo carrier 10 presents an extremely low profile with the result that the carrier not only has a pleasing appearance, but causes a minimum of resistance during high speed travel of the vehicle on which it is mounted.

What is claimed is:

1. A folding cargo carrier for motor vehicles, said folding cargo carrier comprising:
   a. rigid horizontally disposed generally rectangular top and bottom panels;
   b. spaced rigid side and end panels, at least one of said panels having an access opening formed therein and a closure member disposed to cover said opening;

c. hinge means securing the lower edge portion of each of said side and end panels to extend along respective side and end edge portions of said bottom panel for pivotal movements of said side and end panels between a first generally vertically disposed cargo enclosure position extending between said top and bottom panels and a second generally horizontally disposed position closely overlying said bottom panel with said top and bottom panel in a closely spaced intimate relationship to form a thin cargo supporting platform;

d. independently operable connecting means slidably mounting an upper edge of each of said side panels to said top panel to control the position of said top panel relative to said bottom panel during said movements of said side panels between said first and second positions to permit one side panel to be positioned in either of its first and second positions independently of the other side panel;

e. first latch means releasably securing said side and end panels in said first position whereby said first latch means and rigid panels provide a rigid structure wherein said cargo carrier is operable at highway speeds in a cargo enclosure position;

f. second latch means releasably securing said top and bottom panels in said second position whereby said second latch means and rigid panels provide the thin cargo supporting platform wherein said cargo carrier is operable at highway speeds in a cargo supporting platform position; and g. support means securing and supporting said cargo carrier on the roof of the motor vehicle.

2. The structure of claim 1 wherein said top panel has angularly downwardly formed wing portions extending along opposite side edges thereof, wherein said side panels each include opposite end edges, one end edge of each side panel being disposed to slant angularly toward a respective other end edge, wherein one of said end panels in said first position is disposed to slant angularly toward the other of said end panels in conjunction with said one end edge of each of said side panels, and wherein said top panel adjacent said one end panel includes an extension hingedly connected to the adjacent end edge of said top panel, said extension lying generally in juxtaposition with said one end panel in said first position and assuming a generally coplanar position with respect to said top panel in said second position.

3. The structure of claim 1 wherein said hinge means includes upwardly formed flanges extending along said side and end edge portions of said bottom panel and hinge pins on the lower edge of said side and end edge panels, said hinge pins having opposite end portions extending beyond the opposite ends of a respective panel and being positioned inwardly and adjacent to a respective one of said upwardly formed flanges whereby said end portions of said pins on said end panels overlie adjacent end portions of said pins on said side panels, said upwardly formed flanges at said end edges being formed to overlie and engage respective ones of said ends on said end panels to maintain said positions of said pins during said first and second positions and during movements therebetween.

4. The structure of claim 3 wherein said connecting means comprises:

a. a channel formed on the lower surface of said top panel adjacent each end edge of said top panel and extending between opposite side edges thereof;

b. said channels opening inwardly toward each other and being disposed laterally outwardly of opposite ends of said side panels;

c. trunnions extending from said opposite ends at said upper edge of said side panels and engaged in an adjacent one of said channels for sliding movements longitudinally thereof;

5. The structure of claim 4 wherein inner and outer stop members are mounted on said top panel to limit movements of said trunnions of each side panel toward each other and toward said side edges of said top panel respectively.

6. The structure of claim 5 wherein said latch means securing said side panels in said first position includes a relatively flat latch member secured to the lower surface of said top panel in closely spaced relationship to each side edge of said top panel, each latch member having a portion formed to provide a stop shoulder movable toward and away from said lower surface of said top panel, each of said stop shoulders engaging said upper edge of a respective side panel to maintain said side panels in engagement with said outer stop members and in said first position and wherein said latch means securing said end panels in said first position includes a hinged extension formed along the upper edge of each of said end panels, abutment members formed on the inwardly facing surface of each of said side panels spaced from said upper edge of said end panels, said hinged extensions of said end panels being movable into juxtaposition with the adjacent lower surface of said top panel when said end panels are in said first position to frictionally engage adjacent ones of said abutment members to maintain said end panel in said first position.

7. The structure of claim 6 wherein said further latch means includes a cylinder lock secured to each of said wing portions of said top panel and in which each cylinder lock includes a latch arm pivotal to a position to underlie and engage said bottom panel in said second position.

8. The structure of claim 1 wherein spaced end frames are secured one to each end edge portion of said bottom panel and spaced side frames are secured one to a lower portion of each side panel for movement therewith on the axis of said hinge means of a respective side panel whereby said spaced side and end frames are disposed to extend along said side and end edge portions in generally vertical planes which extend above the level of said top and bottom panel when said cargo carrier is in said second position.

9. The structure of claim 1 wherein said cargo carrier further includes sealing means for sealing the juncture of said side and end panels with each other and said side panels with said top panel when said side panels are in said first position.

10. The structure of claim 1 wherein said support means includes:

a. a pair of spaced supporting members, each having laterally extended leg portions;

b. said leg portions having foot portions which cooperate to define a downwardly facing arcuate surface generally coextensive with said leg portions and engaging the vehicle roof along the extent of said leg portions;

c. pivot means securing said leg portions of each supporting member to said bottom panel on aligned axes for movements of a lateral end of said leg portion of each support member in a vertical direction whereby to vary the curvature of said arcuate surface; and, d. securing means at said lateral end of each of said leg portions of each supporting member securing said arcuate surface in a desired degree of arcuate curvature with said top and bottom panel in a horizontal relationship with the roof of the motor vehicle.

11. The structure of claim 10 wherein each of said end edge portions includes an upwardly formed flange extending along a respective end edge portion, wherein said support members are disposed to extend one along each of said end edge portions of said bottom panel between said side edge portions thereof, wherein said pivot means for each support member is an inner nut-equipped bolt extending through said upwardly formed flange and adjacent inner ends of said leg portions centrally between said side edge portions of said bottom panel and wherein said securing means is an outer nut-equipped bolt extending through said upwardly formed flange and said lateral end of each leg portion of each support member, each of said lateral ends having a vertically extended slot formed therein through which said outer bolt extends.

12. The structure of claim 10 wherein said support means further includes a downwardly opening channel member extending generally peripherally of said bottom panel laterally outwardly of said support members and a flexible resilient skirt having an upper edge engaged in said channel and a lower edge engaged with the roof of the motor vehicle, said skirt being coextensive with said channel to extend peripherally of said bottom panel and enclose said support members beneath said bottom panel.

13. The structure of claim 12 wherein said downwardly opening channel member extending along each of said end edge portions is formed as a part of said leg portion of said support members and wherein said downwardly opening channel member extending along each side edge portion includes means mounting such channel member for vertical adjustments relative to the roof of the motor vehicle.

14. A folding cargo carrier for motor vehicles comprising:

a. rigid horizontally disposed generally rectangular top and bottom panels;

b. spaced rigid side and end panels, at least one of said panels having an access opening formed therein and a closure member disposed to cover said opening;

c. hinge means securing the lower portion of said side and end panels to extend along respective side and end edge portions of said bottom panel for pivotal movements of said side and end panels between a first generally vertically disposed cargo enclosure position extending between said top and bottom panels and a second generally horizontally disposed position overlying said bottom panel with said top and bottom panel in a closely spaced relationship to form a cargo supporting platform;

d. connecting means slidably mounting an upper edge of said side panels to said top panel to control the position of said top panel relative to said bottom panel during said movements of said side panels between said first and second position;

e. latch means releasably securing said side and end panels in said first position;

f. further latch means releasably securing said top and bottom panels in said second position;

g. support means securing and supporting said cargo carrier on the roof of the motor vehicle;

h. said top panel having angularly downwardly formed wing portions extending along opposite side edges thereof;

i. said side panels each including opposite end edges, one end edge of each side panel being disposed to slant angularly toward a respective other end edge whereby one of said end panels in said first position is disposed to slant angularly toward the other of said end panels in conjunction with said one end edge of each of said side panels; and j. said top panel adjacent said one end panel including an extension hingedly connected to the adjacent end edge of said top panel, said extension lying generally in juxtaposition with said one end panel in said first position and assuming a generally coplanar position with respect to said top panel in said second position.

* * * * *